(12) United States Patent
Pruessmeier

(10) Patent No.: US 7,607,050 B2
(45) Date of Patent: Oct. 20, 2009

(54) METHOD AND CONTROL SYSTEM FOR RECOGNIZING A FAULT WHEN PROCESSING DATA IN A PROCESSING SYSTEM

(75) Inventor: Uwe Pruessmeier, Lemgo (DE)

(73) Assignee: Beckhoff Automation GmbH, Verl (DE)

( * ) Notice: Subject to any disclaimer, the term of this patent is extended or adjusted under 35 U.S.C. 154(b) by 417 days.

(21) Appl. No.: 11/583,375

(22) Filed: Oct. 18, 2006

(65) Prior Publication Data

US 2007/0174735 A1 Jul. 26, 2007

Related U.S. Application Data

(63) Continuation of application No. PCT/EP2005/003852, filed on Apr. 13, 2005.

(30) Foreign Application Priority Data

Apr. 19, 2004 (DE) ........................ 10 2004 018 858

(51) Int. Cl.
*G06F 11/00* (2006.01)
(52) U.S. Cl. ........................................ 714/48
(58) Field of Classification Search ............. 714/11–13, 714/25, 31, 32, 37, 38, 45, 48
See application file for complete search history.

(56) References Cited

U.S. PATENT DOCUMENTS 5,506,958 A * 4/1996 Myran ........................ 714/18
6,704,371 B1 * 3/2004 Hishiki et al. ............... 375/316
6,990,616 B1 * 1/2006 Botton-Dascal et al. ..... 714/715
7,423,975 B2 * 9/2008 Johnson et al. ............. 370/252

FOREIGN PATENT DOCUMENTS

| DE | 19532639 A1 | 2/1997 |
| EP | 0287302 A | 10/1988 |
| EP | 0744693 A | 11/1996 |

OTHER PUBLICATIONS

Dipl.-Ing. Jurgen Nikolaizik et al., "Fehlertolerante Mikrocomputersysteme",Berlin; Verlag Technik GmbH Berlin, 1990, pp. 23-67.

* cited by examiner

*Primary Examiner*—Nadeem Iqbal
(74) *Attorney, Agent, or Firm*—David E. Bruhn; Dorsey & Whitney LLP

(57) ABSTRACT

The invention relates to a method for recognizing a fault when processing input data in a processing system to form a data packet which contains output data and a test data item, the test data item being formed in order to confirm the validity of the output data. The following method steps are executed serially: The output data ascertained on the basis of the input data in line with a first processing method. The test data item is ascertained on the basis of the input data in line with a second processing method, with intermediate output data being ascertained on the basis of the input data in line with a third processing method, and a test data item is determined from the ascertained intermediate output data in line with a fourth processing method, wherein the first processing method and the third processing method implement the same function by different routes. A fault is recognized in the processing system if the validity of the output data cannot be confirmed by the test data item.

6 Claims, 2 Drawing Sheets

METHOD AND CONTROL SYSTEM FOR RECOGNIZING A FAULT WHEN PROCESSING DATA IN A PROCESSING SYSTEM

CROSS-REFERENCE TO RELATED APPLICATION(S)

This application is a continuation of International Patent Application No. PCT/EP2005/03852, filed on Apr. 13, 2005, which claims priority to German Application No. 10 2004 018 858.0, filed on Apr. 19, 2004, the contents of both of which are hereby incorporated in their entirety by reference herein.

BACKGROUND OF THE INVENTION

1. Field of the Invention

The invention relates to a method for recognizing a fault when processing data in a processing system to form a data packet. The invention also relates to a processing system in which the method is carried out.

2. Description of the Related Art

In the case of systems for processing safety-related data, data are frequently processed in two or more channels, i.e. the data are processed a plurality of times separately from one another by different routes. In this context, the multichannel property is normally achieved by carrying out the same processing method two or more times on different processing units and comparing the results obtained therefrom with one another. It is assumed that there is a very high probability that the results of the individual processing methods have been calculated correctly if the same result is obtained by all routes. This almost rules out systematic and spontaneous faults in the hardware. It is highly improbable that two unrecognized faults will produce exactly the same result with a fault at the same location. Only then would the fault remain undetected.

However, if the processing takes place in a processing system in which the method steps of all the processing methods are executed serially, for example in a single microprocessor, the multichannel property can be achieved by processing the data serially in the microprocessor a plurality of times. The data are then processed several times in succession. In particular, the multiple processing of the data can be effected in different ways, which means that, by way of example, a calculation algorithm executes different single steps in order to arrive at identical results when the data are processed correctly.

The results obtained in this manner are now checked for equality. One problem, particularly in the case of processing in a single microprocessor, is that it is not possible to ensure that when a microprocessor is faulty or when a processing system is faulty the unequal results from the multichannel processing are not nevertheless interpreted as correct results as a result of a further fault and released for further processing. This is particularly problematical since there are usually just a few method steps required for comparing the ascertained results in order to establish the correctness of the ascertained data. If the multichannel property is implemented in a single microprocessor, however, a fault during a method step in the microprocessor can result in unequal results not being recognized as sound and the processing of the data being continued even though the microprocessor is faulty.

In control engineering, a standard such as PROFISAFE is used for transmitting data, for example, said standard prescribing a specific protocol and a specific format for the useful data. This protects the data which are to be transmitted against all the typical faults on any transmission link, such as falsification and reversal of data. The data are provided with a common data frame address, a checksum and a lifecycle counter.

In systems in which the multichannel property is implemented in a single microprocessor, for example, i.e. in a single information-processing unit, it is not possible to ensure demonstrably that the microprocessor does not forward the incorrect data in the event of a fault being recognized. However, safety-related areas demand "single-fault safety", wherein the processing is demonstrably stopped or the generation and provision of data is stopped when a single fault has occurred. This means that the system must demonstrably always be in a safe state for any fault, in order to be able to rule out any risk to people. It is important in this context that the fault is recognized by the system itself and the system shuts itself down. This prevents a second fault from occurring and being able to result in an unsafe state.

NIKOLAIZIK, Jürgen; NKOLOV, Boris; WARLITZ, Joachim; Fehlertolerante Mikrocomputersystems [Fault-tolerant microcomputer systems]. Berlin: Verl. Technik 1990 pages 23-67. (ISBN: 3-341-00959-4) discloses a fault-tolerant microcomputer system having a central processing unit in which fault recognition is effected by carrying out data processing with two different programs in succession, the results being compared in order to detect a fault.

SUMMARY OF THE INVENTION

The invention refers to a method for recognizing a fault when processing data to form a data packet, which method provides single-fault safety for carrying out the processing in a processing system in which the processing steps of a processing method are executed serially. The invention also refers to a processing system for processing data to form a data packet, which processing system allows an occurring fault to be reliably recognized.

In line with a first aspect of the present invention, a method recognizes a fault when processing input data in a processing system to form a data packet which contains output data and a test data item, the test data item being formed in order to confirm the validity of the output data. The following method steps are executed serially: The output data are ascertained on the basis of the input data in line with a first processing method. The test data item is ascertained on the basis of the input data in line with a second processing method, with intermediate output data being ascertained on the basis of the input data in line with a third processing method, and a test data item being determined from the ascertained intermediate output data in line with a fourth processing method, wherein the first processing method and the third processing method implement the same function by different routes. A fault is recognized in the processing system if the validity of the output data cannot be confirmed by the test data item.

In line with a second aspect of the present invention, a method for recognizes a fault when processing input data in a processing system to form a data packet which contains output data and a test data item, the test data item being formed in order to confirm the validity of the output data. The following method steps are executed serially: The output data are ascertained on the basis of the input data in line with a first processing method. The test data item is ascertained on the basis of the input data in line with a second processing method, with intermediate output data being ascertained on the basis of the input data in line with a third processing method, and a test data item being determined from the ascertained intermediate output data in line with a fourth processing method, wherein the first processing method and the third processing method implement the same function by different routes. The output data and the test data item are linked to one another in a data packet. A fault is recognized in the processing system if the validity of the output data cannot be confirmed by the test data item. The determination of the test data item in line with the fourth processing method is followed by the intermediate output data being discarded.

In line with a third aspect of the present invention, a processing system recognizes a fault when processing input data to form a data packet which contains output data and a test data item for confirming the validity of the output data. The processing system comprises a processing unit for the purpose of executing processing steps serially and in so doing ascertaining the output data on the basis of the input data in line with a first processing method and determining the test data item on the basis of the input data in line with a second processing method, wherein determining the test data item involves intermediate output data being ascertained on the basis of the input data in line with a third processing method and determining a test data item from the ascertained intermediate output data in line with a fourth processing method, the first processing method and the third processing method implementing the same function by different routes, and for the purpose of recognizing a fault in the processing system if the validity of the output data cannot be confirmed by the test data item. The processing system further comprises a memory which stores the method steps from the first and second processing methods in order to execute them using the processing unit.

In line with a fourth aspect of the present invention, a processing system recognizes a fault when processing input data to form a data packet which contains output data and a test data item for confirming the validity of the output data. The processing system comprises a processing unit for the purpose of executing processing steps serially and in so doing ascertaining the output data on the basis of the input data in line with a first processing method and determining the test data item on the basis of the input data in line with a second processing method, wherein determining the test data item involves intermediate output data being ascertained on the basis of the input data in line with a third processing method and determining a test data item from the ascertained intermediate output data in line with a fourth processing method, the first processing method and the third processing method implementing the same function by different routes. The processing system further comprises a memory which stores the method steps from the first and second processing methods. A receiver of the data packet formed from the output data and the test data item recognizes a fault in the processing system if the validity of the output data cannot be confirmed by the test data item. The processing unit discards the intermediate output data following the determination of the test data item in line with the fourth processing method.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
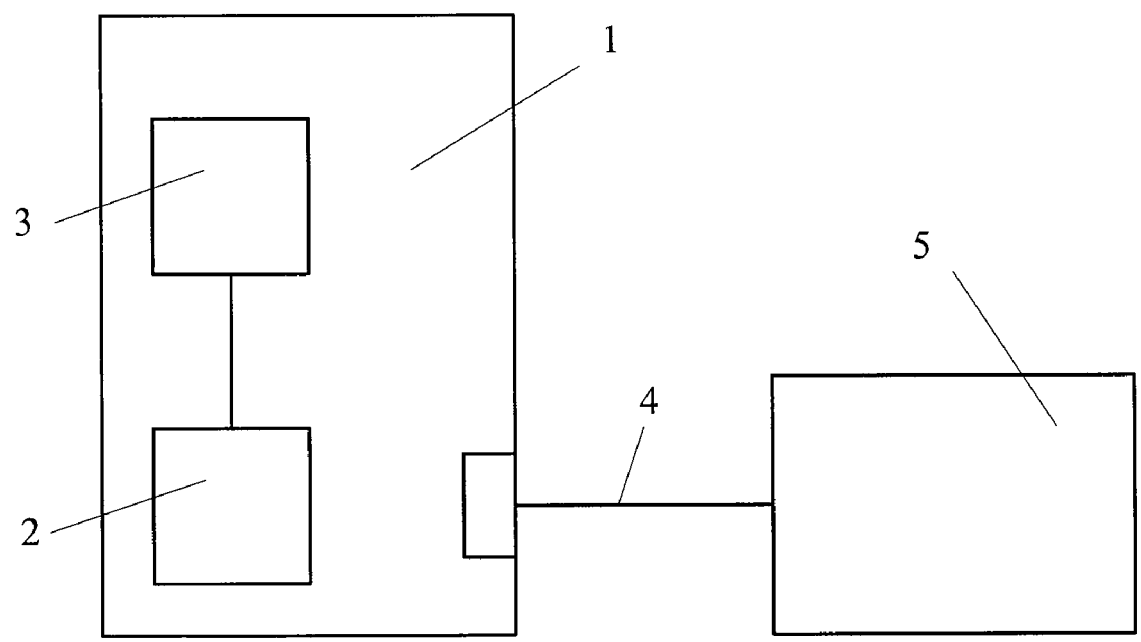
FIG. 1 shows a control system for controlling a machine via a PROFIBUS, in which control system the inventive method is implemented.

FIG. 1 shows a control system 1 having a microprocessor 2 and a memory 3. The memory 3 is used to store program data and useful data. The microprocessor 2 can use the program data to carry out a processing method on the useful data which are stored in the memory 3. By way of example, the microprocessor 2 is a standard microprocessor which executes the method steps of the processing method serially.

The control system 1 is connected to a machine 5, which is intended to be controlled by the control system 1, via a PROFIBUS 4. The PROFIBUS 4 is used to transmit data packets which also contain control data and test data. The control data are results of a first processing method which is carried out in the microprocessor 2. The test data are likewise ascertained in the microprocessor 2 in line with a second processing method and are used to check the validity of the control data on the receiver, i.e. in the machine 5, i.e. the test data and the control data need to be in tune with one another. Normally, the test data can easily be ascertained from the control data, e.g. by forming a checksum.

Figure 2:
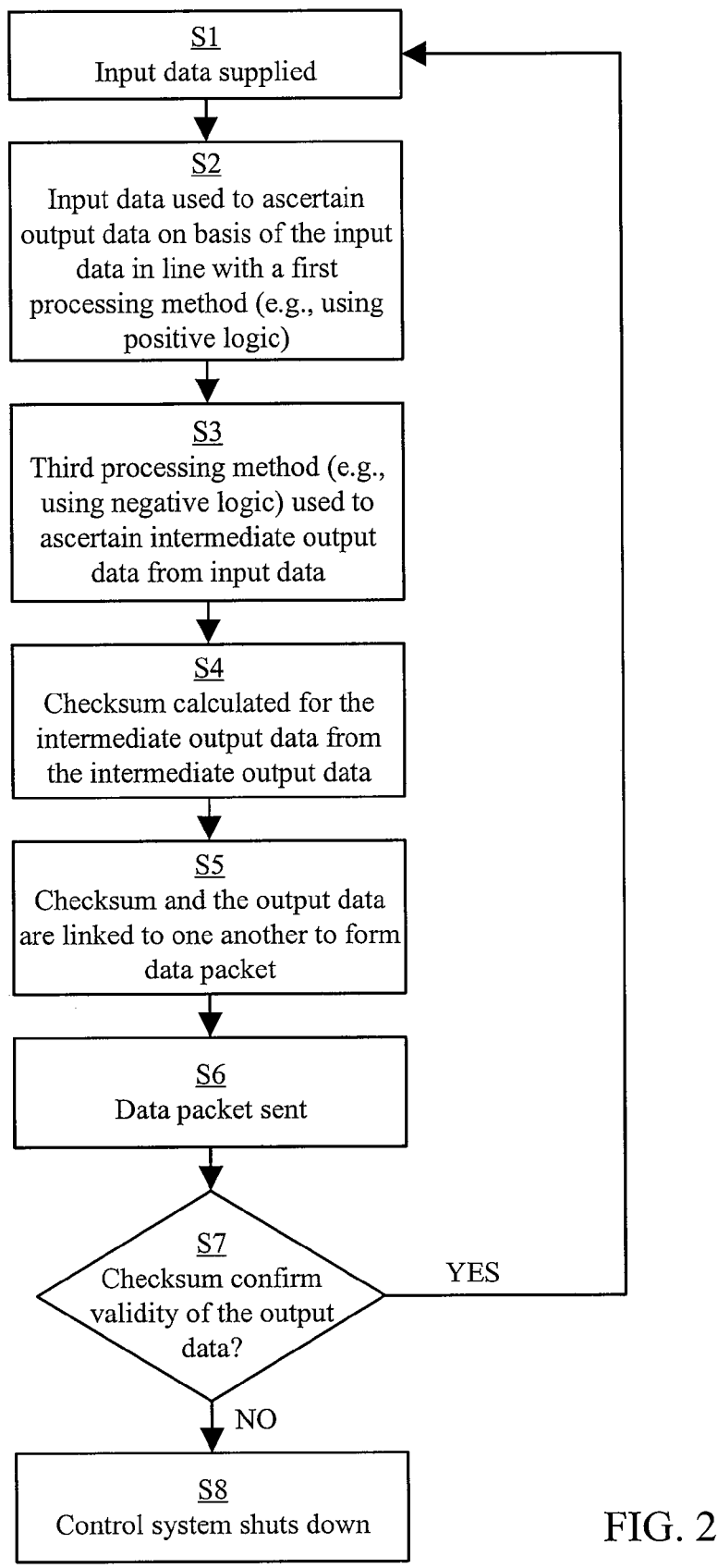
FIG. 2 shows a flowchart to illustrate a preferred embodiment of the inventive method.

FIG. 2 shows a flowchart which shows a preferred embodiment of a processing method based on the invention. Supplied input data (step S1) are first of all used to ascertain output data on the basis of the input data in line with a first processing method in step S2. Next, a third processing method is used to ascertain intermediate output data from the input data (step S3), the first and third processing methods essentially implementing the same function, with the output data expediently being obtained by different routes. By way of example, the first processing method uses positive logic and the third processing method uses negative logic in order to obtain the output data.

The output data obtained using the first processing method and the intermediate output data obtained using the third processing method are identical if the control system is operating correctly. If a fault occurs in the first or third processing method when a particular processing step is executed incorrectly, different output data are obtained from the first processing method and from the third processing method. A checksum calculation based on step S4 is used to calculate a checksum for the intermediate output data from the intermediate output data. If the first processing method and also the third processing method and the checksum calculation are executed correctly, the checksum ascertained in step S4 corresponds to a checksum for the output data ascertained in step S2.

To prevent the intermediate output data and the checksum from being available as a common data packet or in a defined association with one another in the memory 3 and from being incorrectly sent by the control system 1, the execution of step S3 is preferably followed by the intermediate output data not being stored in the memory 3 but rather merely being buffer-stored in registers of the microprocessor or in a cache memory or the like which is separate from the memory 3, and being discarded following the ascertainment of the checksum in step S4, so that they are never present in the memory 3. This ensures that the memory 3 has only the checksum for the intermediate output data ascertained in line with the third processing method available, and not the intermediate output data themselves.

Since the first processing method arrives at the output data by a different route, the output data and the checksum can match one another only if processing is correct, i.e. the checksum confirms the validity of the output data only if the processing methods have been carried out correctly.

The checksum and the output data are linked to one another in a step S5 to form a data packet and can then be sent via the PROFIBUS 4 to the machine 5 which is to be operated, in line with step S6. In step S7, the machine 5 establishes whether the checksum matches the output data, i.e. whether the checksum confirms the validity of the output data. If so, the process returns to step S1.

If a fault is found, the machine 5 can transmit this fault via the PROFIBUS 4 to the control system 1, so that the latter is automatically turned off or stops processing. Alternatively, the machine 5 can block the reception of further data packets from the control system 1 in the event of an erroneous data packet arriving and can shut itself down.

Preferably, the check to determine whether the checksum confirms the output data can be carried out in the control system 1 using the same microprocessor 2, which means that the control system 1 shuts itself down in line with step S8 when a fault has occurred.

As an interface, the control system 1 uses an outwardly protected protocol, such as PROFISAFE, which can be used to operate the PROFIBUS 4. In this context, the data are packed into a frame using different protective mechanisms. The validity of the control data is implemented by a concluding check on the frame of the PROFISAFE protocol. If the check is sound, the data packets can be released and sent. In the event of a fault, the control system 1 is stopped. Should a fault in the control system 1 lead to incorrect subresults and also not prevent sending, the receiver of the data, i.e. the machine 5, can detect the fault when checking the protective frame used and can react accordingly, e.g. by preventing the further sending of erroneous data packets by the control system 1.

The first processing method and the third processing method are preferably carried out using inverse logic, so that identical method steps are prevented from resulting in the same erroneous output data. It is also possible for the first and third processing methods to execute the same function in greatly different ways. This can be achieved using mathematical reshaping methods which can be used to implement the same function in different ways.

It is also possible to calculate the test data item, e.g. in the form of the checksum, directly from the input data without ascertaining the intermediate output data beforehand. This has the advantage that the intermediate output data are never available in the control system, so that the intermediate output data cannot mistakenly be linked to the test data item and sent incorrectly as a data packet by the PROFIBUS 4, for example.

According to the present invention, a method for recognizing a fault when processing data in a processing system to form a data packet which contains output data and a test data item is provided. The processing system executes method steps from a processing method serially. The test data item is formed such as to confirm the validity of the output data. The method comprises the following steps: input data are provided; the output data are ascertained on the basis of the input data in line with a first processing method; the test data item is ascertained in line with a second processing method on the basis of the input data, with the first and second processing methods being carried out in succession in the processing system and being tuned to one another in order to produce the output data and the test data item, for the same input data, such that the output data can be confirmed by the test data item; and a fault is recognized in the processing system if the validity of the output data cannot be confirmed by the test data item.

The inventive method has the advantage that the test data item and the output data are ascertained independently of one another in the processing system, avoiding the output data being ascertained twice or more in the same way in order to find a possible fault. Carrying out the same processing method several times in order to ascertain the output data in a single processing system would normally not allow a fault which is present in the processing system to be recognized, since the fault would have a negative effect on the same processing methods in the same way. The fact that two different, namely the first and second, processing methods are used which calculate different values from one another, namely the output data and the test data item, means that a fault in the processing system results in the output data ascertained in the first processing method and the test data item ascertained in the second processing method not being in tune with one another, i.e. the test data item being unable to confirm the validity of the output data.

Preferably, the test data item ascertained is the checksum for the output data.

Provision may be made for the test data item to be ascertained in line with the second processing method by first ascertaining intermediate output data in line with a third processing method and using the ascertained intermediate output data to ascertain a test data item in line with a fourth processing method. In this context, the third processing method and the first processing method ascertain the output data or intermediate output data by different routes. In particular, the first processing method can be carried out using inverse logic in respect of the third processing method. The effect achieved by this is that the first and third processing methods do not contain the same method steps, which means that when a fault occurs in a method step both processing methods generate different output data. Hence, the test data item ascertained on the basis of the intermediate output data would not confirm the validity of the output data in line with the fourth processing method. This allows a fault to be reliably recognized.

The test data item can be ascertained directly after the ascertainment of the intermediate output data, with the ascertainment of the test data item being followed by the intermediate output data being discarded. The effect achieved by this is that the intermediate output data are not present together with the test data in a memory in the processing system, for example, which means that it is possible to prevent incorrect forwarding of a data packet formed from the intermediate output data and the test data item. The fact that the intermediate output data are not available or only briefly available in the processing system means that it is highly unlikely or almost impossible for the intermediate output data to be forwarded as output data, e.g. on account of a fault in the processing system.

A data packet can be formed from the output data and the test data item, with transmission of the data packet being followed by a check to determine whether the test data item confirms the validity of the output data in order to check the validity of the data packet.

A processing system for recognizing a fault when processing data to form a data packet can be provided. The processing system has a processing unit for executing processing steps in a processing method serially, for ascertaining output data on the basis of input data in line with a first processing method, and for ascertaining a test data item on the basis of the input data in line with a second processing method. In addition, a memory is provided in which the method steps of the first and second processing methods are stored in order to execute them using the processing unit. The first and second processing methods are carried out in succession in the processing system and are in tune with one another such as to generate the output data and the test data item, for the same input date, such that the validity of the output data can be confirmed by the test data item. There is also a fault ascertainment unit provided for recognizing a fault when the output data item cannot be confirmed by the test data item.

A transmission unit can be provided in order to link the test data item and the output data to form a data packet and in order to transmit said data packet via a network.

This is possible particularly if the test data calculation can be linked to the function of the first processing method to form a new processing method with different method steps wherein the number of processing steps which are identical to the first processing method is as small as possible, and in particular zero.

The preceding description only describes advantageous exemplary embodiments of the invention. The features disclosed therein and the claims and the drawings can, therefore, be essential for the realization of the invention in its various embodiments, both individually and in any combination. While the foregoing is directed to embodiments of the present invention, other and further embodiments of this invention may be devised without departing from the basic scope of the invention, the scope of the present invention being determined by the claims that follow.

What is claimed is:

1. A method for recognizing a fault when processing input data in a processing system to form a data packet which contains output data and a test data item, the test data item being formed in order to confirm the validity of the output data, wherein the following method steps are executed serially:

the output data are ascertained on the basis of the input data in line with a first processing method;

the test data item is ascertained on the basis of the input data in line with a second processing method, with intermediate output data being ascertained on the basis of the input data in line with a third processing method, and the test data item being determined from the ascertained intermediate output data in line with a fourth processing method, wherein the first processing method and the third processing method implement the same function by different routes;

the output data and the test data item are linked to one another in a data packet; and a fault is recognized in the processing system if the validity of the output data cannot be confirmed by the test data item;

wherein the determination of the test data item in line with the fourth processing method is followed by the intermediate output data being discarded.

2. The method of claim 1, wherein the test data item ascertained is a checksum for the output data.

3. The method of claim 1, wherein the first processing method is carried out with inverse logic in respect of the third processing method.

4. The method of claim 1, wherein transmission of the data packet formed from the output data and the test data item is followed by a check to determine whether the test data item can be ascertained from the output data in line with the second processing method in order to check the validity of the data packet.

5. A processing system for recognizing a fault when processing input data to form a data packet which contains output data and a test data item for confirming the validity of the output data, the system comprising:

a processing unit for the purpose of executing processing steps serially and in so doing ascertaining the output data on the basis of the input data in line with a first processing method and determining the test data item on the basis of the input data in line with a second processing method, wherein determining the test data item involves intermediate output data being ascertained on the basis of the input data in line with a third processing method and determining the test data item from the ascertained intermediate output data in line with a fourth processing method, the first processing method and the third processing method implementing the same function by different routes; and a memory which stores the method steps from the first and second processing methods;

wherein a receiver of the data packet formed from the output data and the test data item recognizes a fault in the processing system if the validity of the output data cannot be confirmed by the test data item; and wherein the processing unit discards the intermediate output data following the determination of the test data item in line with the fourth processing method.

6. The processing system of claim 5, wherein a transmission unit for the receiver is provided for the purpose of transmitting the data packet formed from the test data item and the output data.

* * * * *

UNITED STATES PATENT AND TRADEMARK OFFICE
CERTIFICATE OF CORRECTION

PATENT NO. : 7,607,050 B2 Page 1 of 1
APPLICATION NO. : 11/583375
DATED : October 20, 2009
INVENTOR(S) : Uwe Pruessmeier It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 419 days.

Signed and Sealed this

Twelfth Day of October, 2010

David J. Kappos
*Director of the United States Patent and Trademark Office*